United States Patent
Jensvold et al.

(10) Patent No.: US 10,561,978 B2
(45) Date of Patent: Feb. 18, 2020

(54) MEMBRANE-BASED GAS SEPARATION WITH RETENTATE SWEEP

(71) Applicant: Generon IGS, Inc., Houston, TX (US)

(72) Inventors: John A. Jensvold, Benicia, CA (US); Kyle A. Jensvold, Walnut Creek, CA (US)

(73) Assignee: Generon IGS, Inc., Houston, TX (US)

(*) Notice: Subject to any disclaimer, the term of this patent is extended or adjusted under 35 U.S.C. 154(b) by 138 days.

(21) Appl. No.: 15/895,095

(22) Filed: Feb. 13, 2018

(65) Prior Publication Data

US 2019/0046922 A1 Feb. 14, 2019

Related U.S. Application Data

(60) Provisional application No. 62/543,124, filed on Aug. 9, 2017.

(51) Int. Cl.
*B01D 53/22* (2006.01)
*B01D 69/08* (2006.01)

(52) U.S. Cl.
CPC .......... *B01D 53/226* (2013.01); *B01D 69/08* (2013.01); *B01D 2053/224* (2013.01); *B01D 2256/10* (2013.01); *B01D 2256/12* (2013.01); *B01D 2257/102* (2013.01); *B01D 2257/104* (2013.01); *B01D 2258/06* (2013.01); *B01D 2311/04* (2013.01); *B01D 2311/06* (2013.01); *B01D 2311/08* (2013.01); *B01D 2311/13* (2013.01); *B01D 2311/24* (2013.01); *B01D 2311/25* (2013.01); *B01D 2317/022* (2013.01); *B01D 2317/025* (2013.01); *B01D 2317/06* (2013.01)

(58) Field of Classification Search
CPC .... B01D 53/22; B01D 53/225; B01D 53/226; B01D 2311/13
See application file for complete search history.

(56) References Cited

U.S. PATENT DOCUMENTS

| | | | |
|---|---|---|---|
| 4,881,953 A | 11/1989 | Prasad | |
| 5,226,932 A * | 7/1993 | Prasad | B01D 53/22 95/45 |
| 5,591,250 A | 1/1997 | Stern | |
| 5,611,842 A * | 3/1997 | Friesen | B01D 53/22 95/50 |

(Continued)

FOREIGN PATENT DOCUMENTS

| | | |
|---|---|---|
| JP | 2009-242773 A | 10/2009 |
| WO | 2000-06293 A1 | 2/2000 |
| WO | 2011-009919 A1 | 1/2011 |

*Primary Examiner* — Jason M Greene
(74) *Attorney, Agent, or Firm* — William H. Eilberg

(57) ABSTRACT

A multi-stage polymeric membrane module system separates a gas, such as air, into components of high purity. In at least two of the stages, a portion of the retentate gas is directed into the low-pressure side of the module, to act as a sweep gas. The use of the sweep gas reduces the partial pressure of permeate gas on the low-pressure side of the membrane, and therefore improves the flow of permeate through the membrane. In a preferred embodiment, there are three modules. The output streams are taken from the retentate outlet of one module, and from the permeate outlet of another module. The output streams have very high purity, relative to the number of modules required, as compared with systems of the prior art.

9 Claims, 2 Drawing Sheets

(56) References Cited

U.S. PATENT DOCUMENTS

| | | | |
|---|---|---|---|
| 5,919,285 A | 7/1999 | Li | |
| 6,168,649 B1 | 1/2001 | Jensvold | |
| 6,180,008 B1 | 1/2001 | White | |
| 6,425,267 B1 | 7/2002 | Baker | |
| 6,565,626 B1 | 5/2003 | Baker | |
| 6,648,944 B1 | 11/2003 | Baker | |
| 7,294,174 B2 | 11/2007 | Coan | |
| 7,497,894 B2 | 3/2009 | Jeffers | |
| 7,517,388 B2 | 4/2009 | Jensvold | |
| 7,578,871 B2 | 8/2009 | Jensvold | |
| 7,662,333 B2 | 2/2010 | Coan | |
| 8,398,755 B2 | 3/2013 | Coan | |
| 8,409,324 B1 | 4/2013 | Straub | |
| 8,999,038 B2 * | 4/2015 | Ungerank | B01D 53/226 95/51 |
| 2004/0168570 A1 | 9/2004 | Franek | |
| 2006/0196355 A1 | 9/2006 | Ekiner | |
| 2008/0223212 A1 * | 9/2008 | Crowder | B01D 53/22 95/52 |
| 2011/0167821 A1 | 7/2011 | Baker | |
| 2013/0042755 A1 * | 2/2013 | Majumdar | B01D 53/226 95/47 |
| 2018/0133643 A1 * | 5/2018 | Ho | B01D 53/226 |

\* cited by examiner

| Example | Alpha | Sweep? | Pressure | Stream 10 purity | Stream 8 purity | Modules/stream 1 (scfm) | | Recycled streams % of Raw feed | Stream 6 %of 5 | Stream 9 %of 8 |
|---|---|---|---|---|---|---|---|---|---|---|
| 1 | 30 | No | 200 | 99.0% | 99.50% | 0.108 | | 60.3 | | |
|   | 30 | Yes | 200 | 99.0% | 99.50% | 0.098 | 9.3% less | 63.7 | 3.0% | 4.40% |
| 2 | 30 | No | 100 | 99.0% | 99.50% | 0.261 | | 91.1 | | |
|   | 30 | Yes | 100 | 99.0% | 99.50% | 0.235 | 10% less | 91.1 | 0.0% | 8.20% |
| 3 | 15 | No | 117 | 98.0% | 99.00% | 0.362 | | 127 | | |
|   | 15 | Yes | 117 | 98.0% | 99.00% | 0.346 | 4.4% less | 127 | 0.0% | 5.50% |
| 4 | 45 | No | 117 | 98.0% | 99.00% | 0.161 | | 41.6 | | |
|   | 45 | Yes | 117 | 98.0% | 99.00% | 0.143 | 11.2% less | 41.6 | 1.9% | 5.10% |
| 5 | 45 | No | 117 | 99.5% | 99.50% | 0.154 | | 74.2 | | |
|   | 45 | Yes | 117 | 99.5% | 99.50% | 0.132 | 14.3% less | 74.2 | 1.3% | 7.00% |

Module=1 module containing 565000 fibers (135 x 95 microns), 2.4 feet long

FIG. 2

MEMBRANE-BASED GAS SEPARATION WITH RETENTATE SWEEP

CROSS-REFERENCE TO RELATED APPLICATION

Priority is claimed from U.S. provisional patent application Ser. No. 62/543,124, filed Aug. 9, 2017, the entire disclosure of which is hereby incorporated herein.

BACKGROUND OF THE INVENTION

The present invention relates to the separation of gas into components, using polymeric membranes.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

Alternatively, the gas can be introduced from the shell side of the module. In this case, the permeate is withdrawn from the bore side, and the non-permeate is taken from the shell side.

An example of a membrane-based air separation system is given in U.S. Pat. No. 4,881,953, the disclosure of which is incorporated by reference herein.

Other examples of fiber membrane modules are given in U.S. Pat. Nos. 7,497,894, 7,517,388, 7,578,871, and 7,662,333, the disclosures of which are all hereby incorporated by reference.

Two major criteria used in designing a membrane-based gas separation system are 1) the selectivity of the membrane, and 2) the amount of energy required to operate the compressor. In many applications, one desires gaseous product streams of high purity, while minimizing the amount of energy used in operating the compressor.

The flow rate of a gaseous component through a membrane is proportional to the difference in partial pressures of that component, on either side of the membrane. Therefore, a membrane which is highly selective for a particular component will yield a large quantity of that component, as the permeate gas, downstream of the membrane. But as the permeate gas accumulates downstream of the membrane, the presence of such permeate gas impedes the further transport of that component through the membrane.

Various attempts have been made to overcome the above problem, such as by providing multiple membrane separation stages, and by the recycling of output streams. However, such solutions have often required more energy in moving the gases through the system. Module arrangements have been proposed which operate at lower pressure, so as to minimize power requirements, but such solutions have also limited the amount of gas which can be processed.

The present invention provides a method and apparatus which allows greater throughput, while providing product gas streams of high purity, and while still minimizing energy requirements.

SUMMARY OF THE INVENTION

The present invention comprises a system and method for non-cryogenic separation of gases. In one embodiment, the system includes three stages, each stage including a module having a plurality of polymeric fiber membranes. In at least one of the stages, a portion of the retentate gas is directed into the downstream, or low-pressure, side of the same module. This retentate sweep gas thereby removes and/or dilutes the gas on the low-pressure side of the module, thus maintaining or increasing the partial pressure difference of the permeate component, on either side of the membrane. By maintaining a greater partial pressure difference, the amount of gas permeating through the membrane is enhanced, and the module makes more product per unit of time.

The sweep gas could be taken from any source, but the most convenient source is the retentate gas produced by the module, as that gas is readily available.

Although the diversion of some of the retentate gas reduces the overall throughput of the system, it turns out that such loss is minor compared with the benefits achieved by the invention. Computer simulations indicate that the use of the present invention can significantly reduce the number of membrane modules required to achieve a desired level of product purity, and without requiring an additional compressor. The invention therefore provides, in general, a higher quality product, without requiring additional energy input.

The present invention therefore has the primary object of providing a non-cryogenic system and method for separating gas into components.

The invention has the further object of improving the efficiency of a membrane-based gas-separation process.

The invention has the further object of enhancing the purity of products made by a membrane-based gas-separation unit, without requiring the expenditure of additional energy.

The invention has the further object of enhancing the purity of products made by a membrane system, without substantial sacrifice of throughput.

The invention has the further object of reducing the cost of operation of a membrane-based gas-separation system.

The reader skilled in the art will recognize other objects and advantages of the present invention, from a reading of the following brief description of the drawings, the detailed description of the invention, and the appended claims.

BRIEF DESCRIPTION OF THE DRAWINGS

FIG. 2 provides a table summarizing the results of several computer simulations of the system of the present invention.

DETAILED DESCRIPTION OF THE INVENTION

Figure 1:
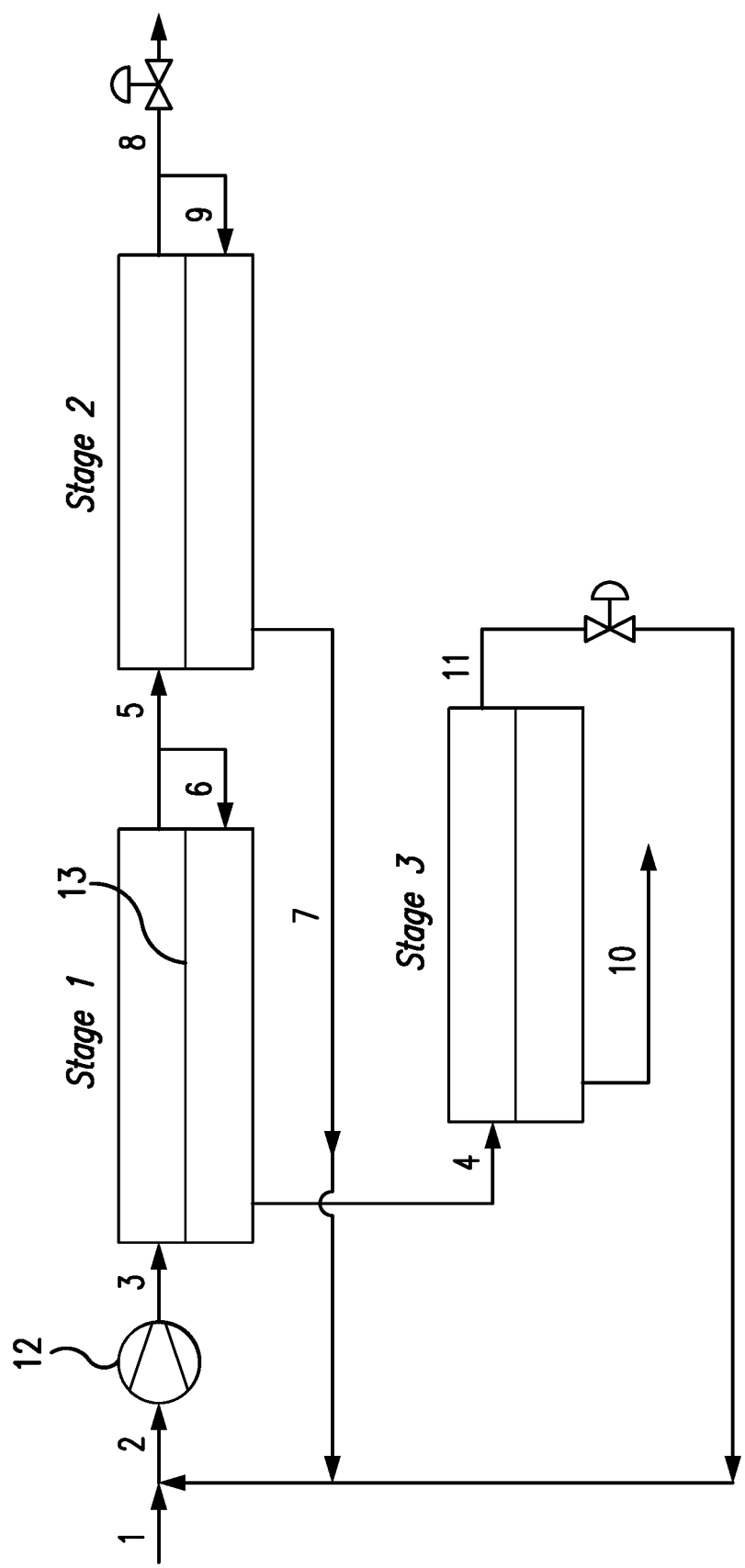
FIG. 1 provides a schematic diagram showing a system made according to the present invention.

The present invention comprises a multi-stage membrane system for separating a gas into components, and in which the components so produced have a high degree of purity. In the embodiment illustrated, the gas has two components.

As explained above, the use of highly selective membranes can produce a permeate gas which is so pure that it actually retards the further passage of that component through the membrane.

The present invention solves this problem by providing a low-pressure sweep stream that contains very little of the permeate gas, so as to dilute the gas which is permeating across the membrane, thus lowering the partial pressure of that permeate gas, so that more of that component may be permeated.

One can use any source for the sweep stream, but the most convenient solution is to use one of the process gases which is internal to the overall gas separation process. In particular, it has been found that the non-permeate, or retentate, stream from one or more stages of the membrane system can be used as this sweep stream. The result has been surprisingly good.

FIG. 1 provides a schematic diagram showing a preferred embodiment of the present invention. In this embodiment, it is assumed that the feed gas contains two components, and that the membranes in the modules are highly selective. In one practical application, the feed gas could be air, with the components being separated being oxygen and nitrogen.

The system shown in FIG. 1 comprises three modules, identified as Stages 1-3. In the circuit shown, Stages 1 and 3 work together to produce a high-purity product at conduit 10, and Stages 1 and 2 work together to produce a high-purity product at conduit 8.

In FIG. 1, a raw feed gas enters through conduit 1, and passes, through conduit 2, into compressor 12, through conduit 3, and into Stage 1. Stage 1 represents a module containing multiple fibers made of a suitable polymeric membrane. The membrane is symbolically illustrated by the horizontal line 13.

It is understood that the actual configuration of the membrane module will likely be very different from what is schematically illustrated, and the figure is not intended to show the exact physical structure of the module. Indeed, a preferred construction of the membrane module is to provide each module with a large number of polymeric fibers. The gas can be introduced outside the fibers, in a "shell-side" feed, or it could be introduced inside the fibers, in a "bore-side" feed. In either case, the gas is in the high-pressure region before it passes through the membrane, and it is in the low-pressure region after it has passed through the membrane.

FIG. 1 shows that the incoming stream, from conduit 3, enters the module of Stage 1 at the upstream side of the membrane, which is the area above the line 13 in Stage 1. The upstream side is also known as the high-pressure side, because the pressure of incoming gas is greater on this side of the membrane. The area below the line 13 represents the downstream, or low-pressure side, of the module. Gas which has permeated through the membrane exits at a lower pressure than the gas which is first passing through the membrane. The schematic representations of Stages 2 and 3 are similar to that of Stage 1.

The gas which exits the module through conduit 4 is the permeate gas produced in Stage 1. The gas which exits the module through conduit 5 is the retentate gas produced in Stage 1.

The other stages operate in similar fashion. The permeate gas produced in Stage 2 flows through conduit 7 back to conduit 2, and the retentate gas produced in Stage 3 flows through conduit 11 back to conduit 2. Conduit 2 thus contains the raw feed gas plus the recycled streams 7 and 11.

In the embodiment shown, the retentate gas in conduit 11 is not used as a sweep gas, because one seeks the highest purity for the gas appearing in conduit 10. Moreover, simulations performed to evaluate the present invention, and described below, suggest that adding a retentate sweep in Stage 3 does not confer significant benefits. Notwithstanding the above, a retentate sweep could be used in Stage 3, if desired, within the scope of the present invention.

The product gases in this system are the gases appearing at conduit 8, which is the retentate gas of Stage 2, and at conduit 10, which is the permeate gas of Stage 3.

According to the present invention, a portion of the retentate gas from Stage 1 is directed into the downstream area of Stage 1, through conduit 6. That is, a portion of the retentate gas of Stage 1 is used as a sweep gas for that stage. Similarly, a portion of the retentate gas of Stage 2 is directed through conduit 9 into the downstream area of Stage 2, to function as a sweep gas for Stage 2.

The amount of gas used as a sweep gas, in both stages, is a small fraction of the respective retentate stream of either Stage 1 or Stage 2. Counter-current designed modules are used for this process, in which the sweep gas flows along the length of the module, in a direction opposite to that of the permeate gas. Counter-current flow is recognized as the most efficient manner of operation of a module, as it maximizes the partial pressure differences, and therefore the gas permeation rates, of the highly permeable gas species for the entire length of the module.

Nevertheless, the non-feed end of the module typically has the lowest partial pressure difference between the retentate stream (the portion of the high pressure feed that has been depleted of the highly permeable gas) and the permeate gas at the same end position. Membranes of greater selectivity can make this section of the membrane module almost devoid of any gas transport, since it generates a higher purity permeate gas, boosting its permeate partial pressure and lowering the partial pressure difference between the high and low pressure sides of the membrane. Introduction of a sweep stream of a gas with lower amounts of the highly permeable gas at this position will allow for a greater partial pressure difference to be achieved, so that more of the highly permeable component of the feed/retentate gas can be removed. As explained above, while this sweep stream can come from any source, it is most convenient to use a small fraction of the exiting retentate stream to provide this sweep. Although one is "losing" some of the retentate stream in the process, the overall improved operation of the module system more than compensates for this small loss of gas.

As shown in the examples discussed below, the use of a sweep stream of less than 5% (by volume) of the retentate stream can reduce the membrane surface area requirements by over 20% for a particular stage. This is especially true for stages focused on making high purity retentate streams (i.e. Stage 2 in FIG. 1). But as also shown in the examples, an intermediate stage (Stage 1 in FIG. 1) used to make modestly pure permeate and retentate streams can also benefit, for highly selective membranes.

The present invention was evaluated using a computer simulation of a membrane system. Five examples were chosen, each being simulated with and without a retentate sweep. The parameters of the examples are given below, and the results of the simulations are provided in the table displayed in FIG. 2.

Example 1

This example assumes a feed gas having two components, labeled A and B, and wherein the feed gas is 50% A and 50% B, by volume. This run of the simulation assumes that one produces product streams comprising 99% A and 99.5% B. The method uses hollow fiber membranes with a permeance for component B of 1 GPU (gas permeation unit, expressed as a standard flow per unit time per unit of surface area per unit of pressure), and a permeance for component A of 30. Thus, the ratio of permeance for A to permeance for B, known as alpha, is 30.

All simulations in the examples assumed that each module has 565,000 fibers, with a size of 135×95 microns, and that the fibers are 2.4 feet long. The simulation assumed that the membrane modules could be operated as ideal countercurrent modules.

The feed gas pressure in this example was 200 psig.

Example 2

This example had the same parameters as Example 1, except that the pressure of the feed gas was reduced to 100 psig.

Example 3

In this example, the feed gas pressure was 117 psig. Also, the value of alpha, i.e. the ratio of permeance of component A to the permeance of component B was 15. Finally, in this example, the purities of the products were set to 98% A and 99% B.

Example 4

This example was similar to Example 3, except that the value of alpha was 45.

Example 5

This example was similar to Example 4, except that it was set to produce products having higher purities, namely 99.5% A and 99.5% B.

The simulations were based on standard computer simulations for analyzing the operation of a membrane system. In operating the simulation, one must specify a desired final purity of a product or products, and the simulation responds by providing a theoretical number of modules required to achieve the desired result. In practice, the raw number of modules calculated by the simulation is not integral, and may indeed be fractional, although the number of modules could be normalized if desired. The aim is to obtain a superior result while minimizing the number of modules used.

The table provided in FIG. 2 summarizes the results of the simulations of Examples 1-5.

Each example was operated twice, once with a retentate sweep, and once without such sweep. The value of alpha, i.e. the ratio of permeance of the two components, is given in the second column. The third column indicates the presence or absence (using the nomenclature "yes" or "no") of retentate sweep.

The fourth column provides the pressure of the feed gas, in psig, i.e. the pressure in conduit 1 of FIG. 1.

The streams are identified in the table using the reference numerals of FIG. 1. Thus, "stream 10" in the table refers to the contents of conduit 10, which is the permeate stream of Stage 3. Streams 1, 6, 8, and 9, also referenced in the table, identify the streams in the corresponding conduits of FIG. 1.

Columns 5 and 6 of the table specify the product purity for components A and B (streams 10 and 8) respectively. As stated above, the purity is an input to the simulation, which then calculates the theoretical number of modules required to achieve the desired purity.

Column 7 provides the theoretical number of modules per unit of flow of the raw feed (stream 1). The flows are calculated in the units of scfm (standard cubic feet per minute). Column 7 comprises the key result of each run of the simulation. It shows the theoretical number of modules required, at the desired level of gas purities, for a given amount of flow of raw feed gas.

Column 8 provides the ratio, expressed as a percentage, of the volume of all the recycled streams, relative to the raw feed stream. In general, it is considered preferable to minimize the volume of gas which is recycled. However, the table of FIG. 2 shows that simply reducing the amount of gas that is recycled does not necessarily improve the performance of the system.

Columns 9 and 10 provide the percentage (by volume) of retentate gas which is diverted for use as a sweep gas, for each of Stages 1 and 2, respectively.

A major teaching of Column 7 of the table is that the number of modules required is reduced in every case when the retentate sweep is used. Column 7 includes a tabulation of the percentages by which the number of required modules is reduced by the use of the retentate sweep, for each of the examples. As shown in the table, the reduction in the required number of modules, for this set of examples, can be as great as about 14%. Even in the least advantageous example (Example 3), the number of modules required is reduced by more than 4%.

One could further augment the three-stage process with additional stages added to Stages 2 and 3. The additional stages could benefit from a retentate sweep. A fourth stage could be provided to receive the permeate gas (stream 7) from Stage 2. This fourth stage would have its permeate go back to the feed compressor, while the retentate stream could serve as a second retentate product stream to make a high concentration product stream of the "slow" gas to add to stream 8. Furthermore, an additional Stage 5 could be placed downstream of Stage 3, with stream 11 as its feed. The retentate stream of such Stage 5 could be another high purity "slow" gas stream that would also combine with stream 8. Adding these stages would boost the product yields, but would require more modules than the three-stage embodiment.

The invention can be modified in various ways. As noted above, the retentate sweep can be provided in one, two, or more of the modules of a multi-stage membrane system. The amount of sweep gas used can also be varied. These and other modifications will be apparent to the reader skilled in the art, and should be considered within the spirit and scope of the invention.

What is claimed is:

1. Apparatus for non-cryogenic separation of a gas into components, comprising:
    a) three stages, labeled Stage 1, Stage 2, and Stage 3, each of Stages 1-3 comprising a membrane module defining a path for an inlet gas to flow through a polymeric membrane, each module having an inlet connected to a high-pressure side upstream of the membrane, each module having a low-pressure side downstream of the membrane, the module including a permeate outlet for collecting gas which has permeated the membrane, and a retentate outlet for collecting gas which has not permeated the membrane,
    b) a conduit connecting the retentate outlet of Stage 1 to the low-pressure side of the membrane of Stage 1, a conduit connecting the retentate outlet of Stage 1 to an inlet of Stage 2, and a conduit connecting the permeate outlet of Stage 1 to an inlet of Stage 3,
    c) a conduit connecting the retentate outlet of Stage 2 to the low-pressure side of the membrane of Stage 2, and a conduit connecting the permeate outlet of Stage 2 to an inlet of Stage 1,
    d) a conduit connecting the retentate outlet of Stage 3 to the inlet of Stage 1,
    wherein product components are taken from the retentate outlet of Stage 2 and the permeate outlet of Stage 3.

2. The apparatus of claim 1, further comprising a compressor connected to the inlet of Stage 1, wherein gas entering Stage 1 is compressed by the compressor.

3. The apparatus of claim 2, wherein the conduit connecting the permeate outlet of Stage 2 to the inlet of Stage 1 is connected upstream of the compressor.

4. The apparatus of claim 2, wherein the conduit connecting the retentate outlet of Stage 3 to the inlet of Stage 1 is connected upstream of the compressor.

5. A method of non-cryogenically separating a gas into components, comprising the steps of:
    a) providing three modules, labeled Stage 1, Stage 2, and Stage 3, each module having a polymeric membrane defining a high-pressure side and a low-pressure side, each module having an inlet port connected to the high-pressure side, and a retentate outlet port and a permeate outlet port, the retentate outlet port providing an outlet for gas on the high-pressure side, and the permeate outlet port providing an outlet for gas on the low-pressure side,
    b) conveying a gas into the inlet port of Stage 1,
    c) conveying a portion of gas from the retentate outlet port of Stage 1 into the low-pressure side of Stage 1, while conveying a remainder of gas from the retentate port of Stage 1 into the inlet port of Stage 2,
    d) conveying a portion of gas from the retentate outlet port of Stage 2 into the low-pressure side of Stage 2,
    e) conveying gas from the permeate outlet port of Stage 1 into the inlet port of Stage 3,
    f) conveying gas from the retentate outlet port of Stage 3 to the inlet port of Stage 1,
    g) conveying gas from the permeate outlet port of Stage 2 to the inlet port of Stage 1, and
    h) withdrawing output streams from the retentate outlet port of Stage 2 and the permeate outlet port of Stage 3.

6. The method of claim 5, wherein steps b) through h) are performed substantially simultaneously.

7. The method of claim 6, wherein steps f) and g) include conveying said gases to a compressor connected to the inlet port of Stage 1.

8. The method of claim 5, further comprising selecting the portion of gas conveyed from the retentate outlet port of Stage 1 to be less than 5% of the retentate gas exiting Stage 1.

9. The method of claim 5, further comprising selecting the portion of gas conveyed from the retentate outlet port of Stage 2 to be less than 10% of the retentate gas exiting Stage 2.

* * * * *